W. J. OWENS.
ADJUSTABLE TIRE LEVER.
APPLICATION FILED JUNE 1, 1920.
1,398,602.
Patented Nov. 29, 1921.
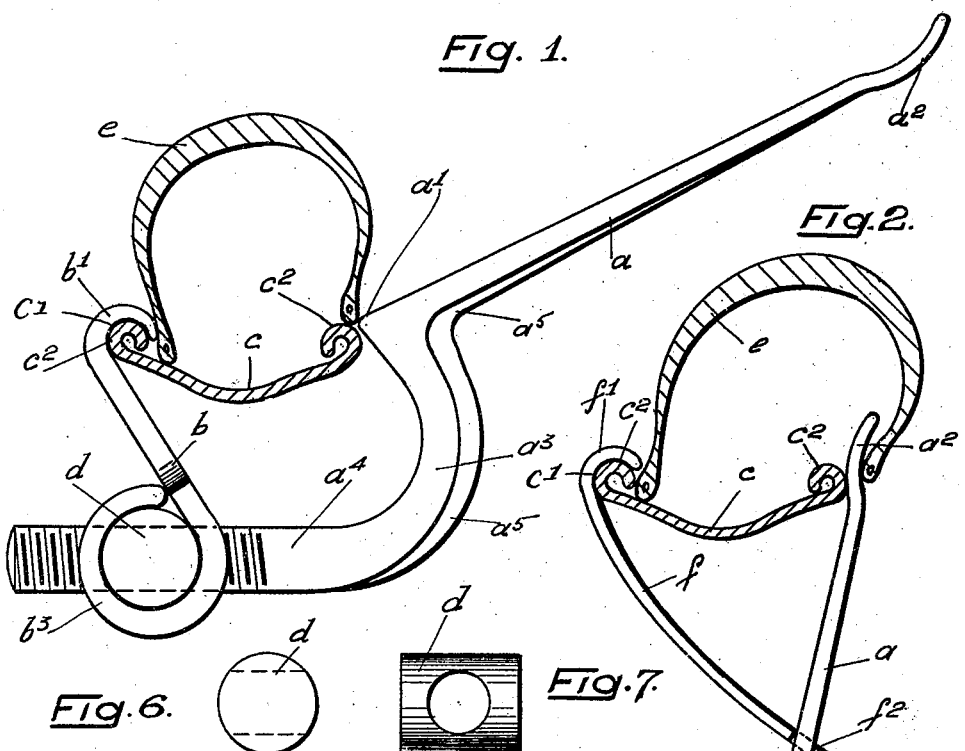
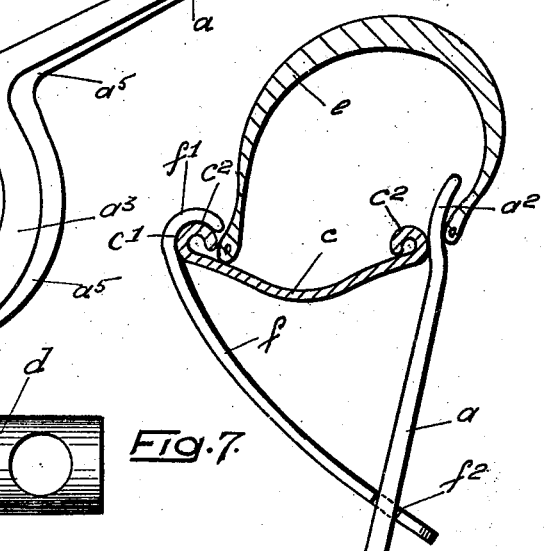
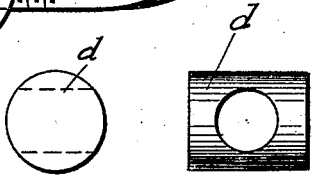
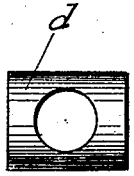
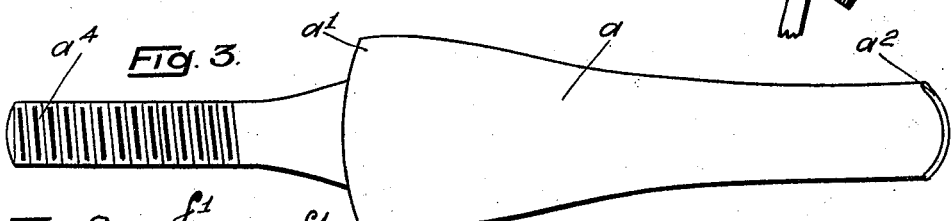
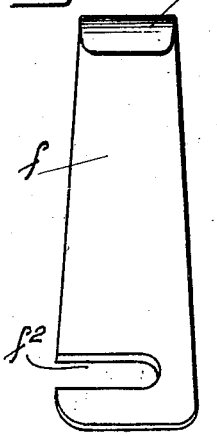
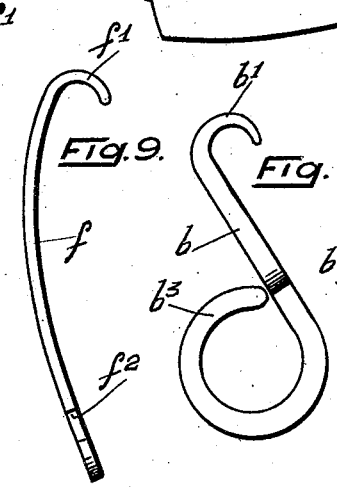
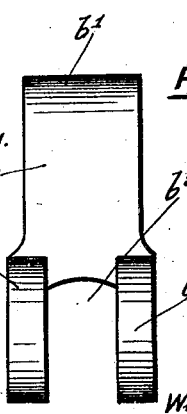
Inventor.
William John Owen.
Per: Rayner & Co.
Attorneys.

UNITED STATES PATENT OFFICE.

WILLIAM JOHN OWENS, OF CHIPPENHAM, ENGLAND.

ADJUSTABLE TIRE-LEVER.

1,398,602.  Specification of Letters Patent.  Patented Nov. 29, 1921.

Application filed June 1, 1920. Serial No. 385,754.

*To all whom it may concern:*

Be it known that I, WILLIAM JOHN OWENS, subject of the King of Great Britain and Ireland, residing at 6 St. Pauls street, Chippenham, in the county of Wiltshire, England, have invented certain new and useful Improvements in Adjustable Tire-Levers, of which the following is a specification.

This invention relates to improvements in tire levers and refers more particularly to the arrangement and method of applying or manipulating tire levers of the type described in my co-pending application for Letters Patent of the United States of America Serial No. 323959, dated September 15th, 1919.

In the prior application I have described and illustrated a tire lever having a cranked end, one part of which is arranged to engage one side of the wheel rim, while another part is adapted to engage the edge of the tire on the opposite side of the wheel rim, so that on the lever being moved about its end connected to the rim of the wheel, the edge of the tire on the opposite side is forced over the rim.

The object of the present invention consists in an improved arrangement and construction whereby the lever may be adjusted for use with any size of wheel rim or tire, for motor car, motor-cycle or bicycle wheels, and also to further facilitate the operation of removing the tire from said wheel rims.

In order that the invention may be readily understood, I will now proceed to describe the same with reference to the accompanying sheet of illustrated drawings, in which:—

Figure 1 is a side view showing the device being used for attaching a tire to the wheel rim, the latter being shown in section.

Fig. 2 shows the device being used to remove the tire from the wheel rim.

Fig. 3 is a plan view of the manipulating lever.

Figs. 4 and 5, are side view and front elevation of the supporting link for one end of the manipulating lever.

Figs. 6 and 7 show in side and front elevation respectively the pivot or pin by which the manipulating lever is connected to the supporting link, and Figs. 8 and 9, show similar views of the retaining hook-like member used for retaining the lever when the latter is being used to remove the tire.

The manipulating lever $a$ is formed intermediate its ends with a shoulder or projection $a^1$ and at one end with a curved or tongue-like member $a^2$, for a purpose hereinafter described. The opposite end of the lever is bent or otherwise formed with a downwardly extending portion $a^3$ and a forwardly projecting portion $a^4$. The portion $a^4$ is preferably screwed externally while the portions $a^3$ and $a^2$ may be substantially flat, and preferably provided with a strengthening rib $a^5$ on the inner side as shown in Fig. 1.

The screwed forwardly projecting end of the lever is supported by a substantially S-shaped link or the like $b$, the upper end $b^1$ of which is shaped to embrace or suitably engage the edge $c^1$ of the wheel rim $c$, while its lower end carries a cylindrical pin or spindle $d$. The lower end of the supporting link is formed with a slot $b^2$ extending longitudinally upward from its end as shown in Fig. 5. The pin $d$ or the like, is of such a size as to snugly and rotatably fit into the bifurcated ends $b^3$ of the link $b$ and is provided with a screwed hole into which the screwed end of the portion $a^4$ of the lever is screwed, the slot $b^2$ permitting rotation of the lever about the axis of the pin.

When the apparatus is being used for fitting or attaching the tire $e$ to the rim $c$, the upper end of the link $b$ is engaged over the edge $c^1$ of the wheel rim $c$ on the opposite side to that over which the edge of the tire is to be fitted. The manipulating lever is now rotated about the axis of the forwardly projecting screwed portion $a^4$ until the correct adjustment is obtained to cause the shoulder $a^1$ to engage the edge of the tire. The lever is now raised, being moved about the axis of the pin $d$ and the edge of the tire may be easily forced over the edge $c^2$ of the wheel rim $c$ as will be readily understood.

In order to facilitate the operation of removing the tire from the wheel rim, I provide a retaining hook-like member $f$ (Figs. 2, 8 and 9). This member comprises a curved piece of steel strip formed with a hook like member $f^1$ at its upper end to engage the edge $c^1$ of the wheel rim $c$, while its opposite end is provided with a transverse slot $f^2$. The plate may be made of any suitable length and is preferably curved as shown so as to extend to a point in the path of the lever *a* when the latter is manipulated as shown in Fig. 2. In this figure the upper curved or tongue-like portion $a^2$ is engaged beneath the edge of the tire and forced down to cause the edge of the tire to be disengaged from the wheel rim. When this operation is being effected, it has been found very difficult to retain the removed portion of the tire while other portions thereof around the circumference of the wheel are similarly treated. To enable the tire to be easily removed, the retaining hook *f* is attached to the edge of the rim opposite to that from which the tire is to be removed, and on the lever *a*, which has been engaged beneath the edge of the tire, being forced down the outer end of the lever is moved laterally to engage in the slot $f^2$ of the retaining hook *f*, so that on a second tire lever being inserted in a similar manner beneath the edge or bead of the tire at a short distance farther around the circumference of the wheel, and leverage being applied thereto, the tire can be easily and quickly removed, without likelihood of injuring the inner tube or the hands of the operator.

I claim:—

1. Apparatus for manipulating the outer covers of pneumatic tires, comprising a manipulating lever, a projection on said lever intermediate its ends adapted to engage one edge of the tire, an externally threaded forwardly projecting portion on said lever, a link of substantially S-shape adapted to embrace the opposite edge of the wheel rim, a cylindrical member rotatably mounted in the lower end of said link and formed with a screwed hole to receive the externally screwed forwardly projecting portion of the lever, for the purposes described.

2. Apparatus for manipulating the outer covers of pneumatic tires, comprising a manipulating lever, a projection on said lever intermediate its ends adapted to engage one edge of the tire, an externally threaded forwardly projecting portion on said lever, a link of substantially S-shape adapted to embrace the opposite side of the wheel rim, a cylindrical member rotatably mounted in the lower end of said link formed with a screwed hole to receive the forwardly projecting end of the lever, and a slot on the lower end of said link through which the forwardly projecting portion of the lever projects, for the purposes described.

WILLIAM JOHN OWENS.